March 8, 1960  D. HEYER  2,927,470
VARIABLE SPEED DRIVE MECHANISM
Filed Nov. 19, 1956  2 Sheets-Sheet 1

INVENTOR.
DON HEYER
BY
Paul A. Weilein
ATTORNEY.

March 8, 1960  D. HEYER  2,927,470
VARIABLE SPEED DRIVE MECHANISM
Filed Nov. 19, 1956  2 Sheets-Sheet 2
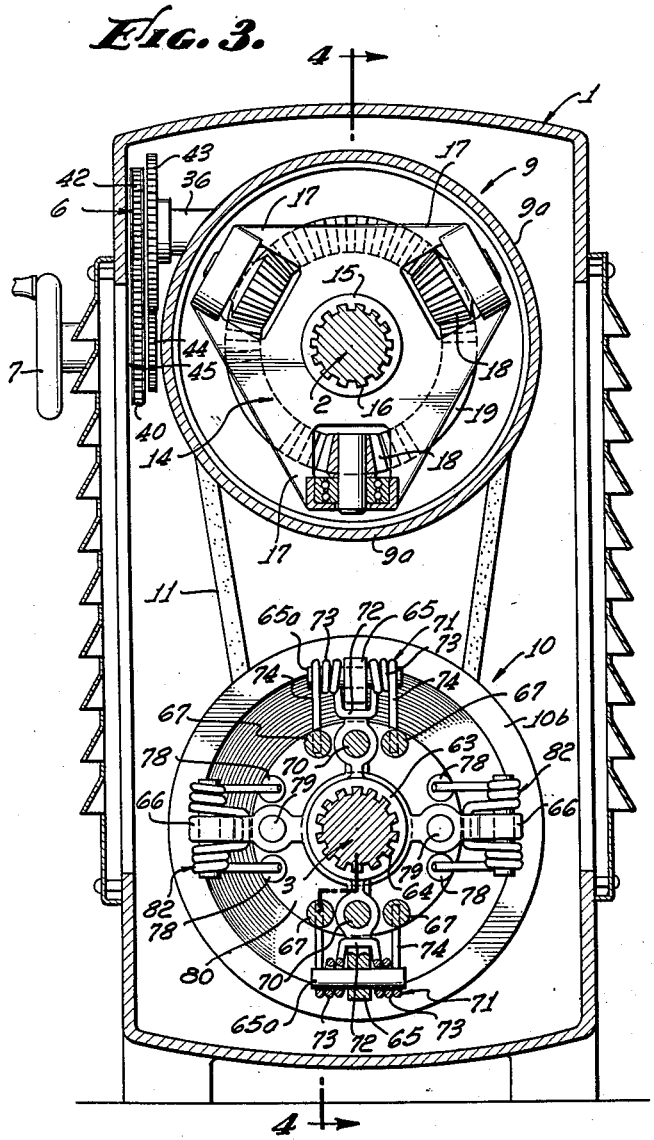
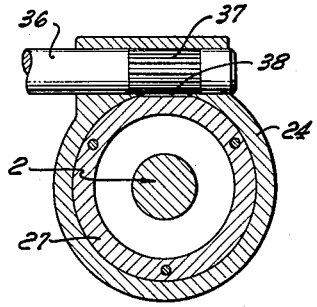
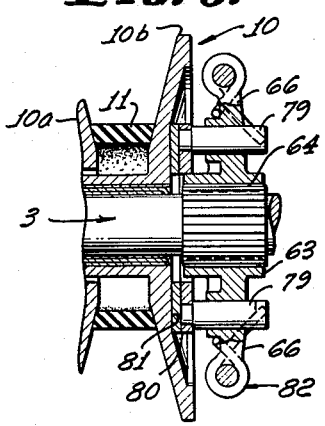
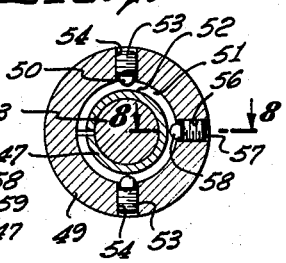
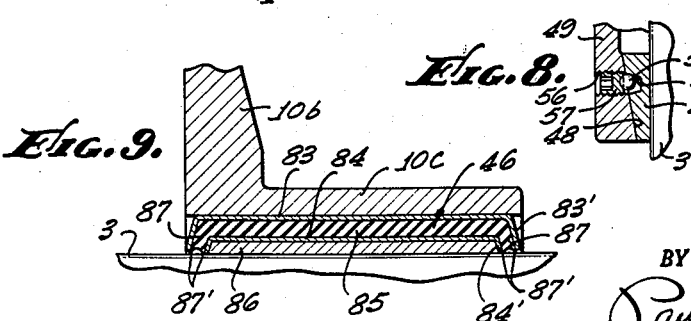
INVENTOR.
DON HEYER
BY
Paul A. Weilein
ATTORNEY.

United States Patent Office 2,927,470
Patented Mar. 8, 1960

2,927,470

VARIABLE SPEED DRIVE MECHANISM

Don Heyer, El Monte, Calif.

Application November 19, 1956, Serial No. 623,151

25 Claims. (Cl. 74—230.17)

This invention relates to variable speed transmission mechanisms of the variable diameter pulley type.

It is an object of this invention to provide variable speed mechanism which is constructed and arranged in a novel manner to prevent the adjustable pulley sections thereof from sticking or fretting when operated at one speed setting for long periods of time.

It is another object of this invention to provide a variable speed drive mechanism of the character described wherein belt and pulley assemblies are constructed and arranged in a novel manner to assure that an equal load will be carried by each belt.

Further it is an object hereof to provide drive mechanism such as described having novel compensating means which will divide the load equally between variable pulley assemblies.

Another object of this invention is the provision of transmission mechanism such as described, which includes a new form of spring loading means for the adjustable pulley sections, whereby the force of this spring means is controlled over travel of the adjustable pulley sections in a manner assuring an efficient operation of the mechanism at all speeds.

It is an additional object of this invention to provide in mechanism such as described, a new arrangement of shaft driving and shaft driven structures that are smooth and have no splines or keyways on the portions which mount the adjustable pulley sections.

An additional object of this invention is the provision of a variable speed transmission mechanism such as described wherein the shafts for the variable diameter pulleys have smooth bearing surfaces making it possible to advantageously employ novel resilient pulley bearings around such surfaces. These resilient bearings cushion shock and jars, preclude fretting and sticking of the axially movable pulley sections and form seals to prevent lubricants from getting on the pulleys and belts.

This invention possesses many other advantages and has other objects which may be made more easily apparent from a consideration of the embodiment of the invention shown in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 3 is a sectional view taken substantially on the line 3—3 of Fig. 2;

Fig. 5 is a fragmentary sectional view taken on the line 5—5 of Fig. 4;

Fig. 6 is a fragmentary horizontal sectional view taken on the line 6—6 of Fig. 4;

Fig. 7 is a sectional view taken on the line 7—7 of Fig. 4;

Fig. 8 is a sectional view taken on the line 8—8 of Fig. 7; and

Fig. 9 is an enlarged fragmentary sectional view of one of the resiliently mounted sealed bearings for the adjustable pulley sections, showing a part of one of such sections.

Figures 1, 2, 4:
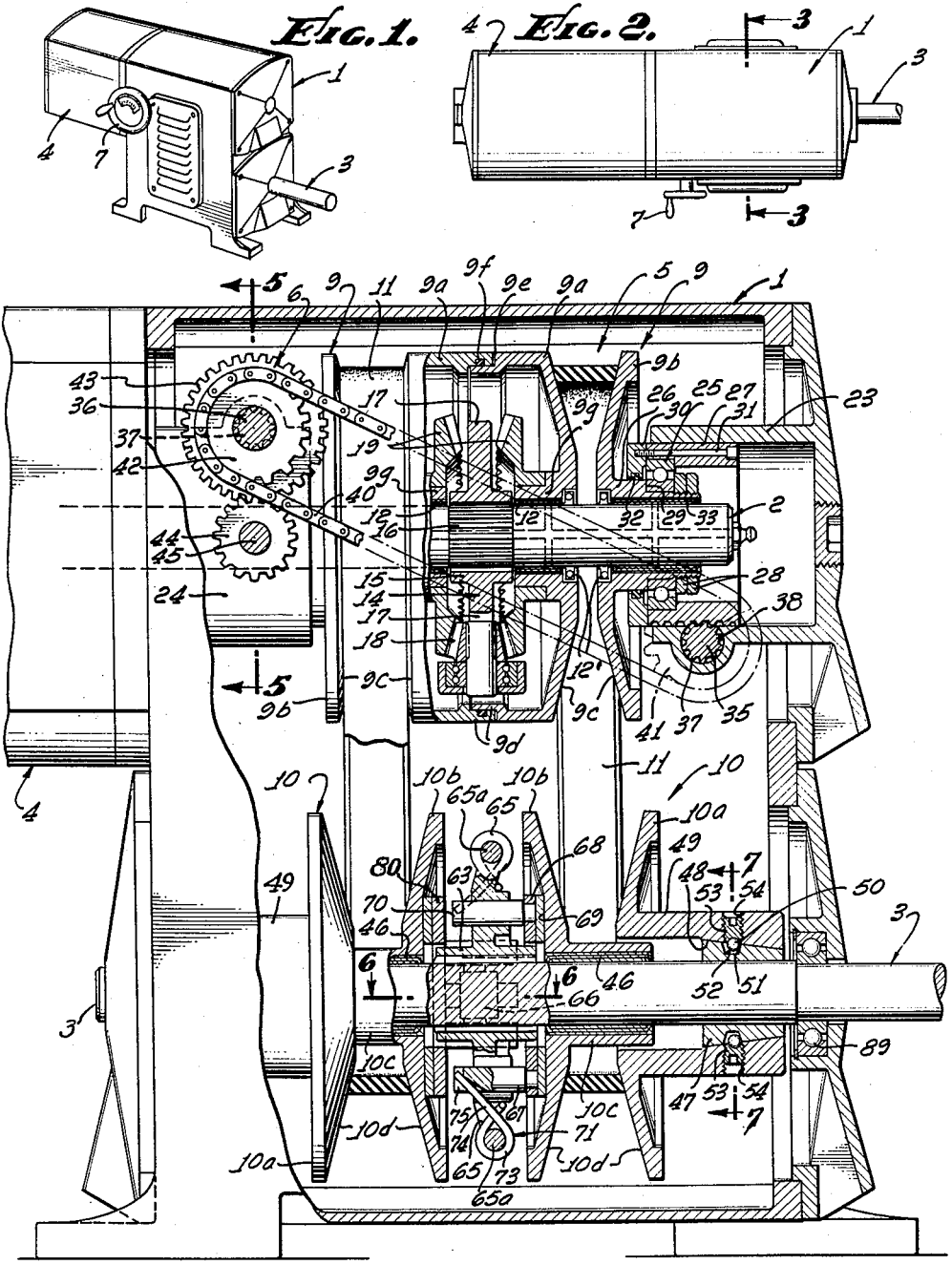
Fig. 1 is a perspective view of a variable speed drive mechanism embodying the present invention.
Fig. 2 is a top plan view of the mechanism shown in Fig. 1.
Fig. 4 is a fragmentary vertical sectional view partly in elevation taken on the line 4—4 of Fig. 3.

Variable speed transmission mechanism embodying the present invention includes a frame or housing 1 for supporting a driving shaft 2 and a driven or power take-off shaft 3. The driving shaft 2 may as here shown be driven by a motor 4 supported by the housing 1 and connected in any suitable manner, not shown, with the shaft 2.

Through variable diameter pulley transmission means generally designated 5, the driving shaft 2 may be operated to drive the driven shaft 3 at different speeds according to variation of the effective diameters of pulleys embodied in this transmission means. The diameter variation is effected by manually operable adjusting means 6 controlled by a hand wheel 7 on the exterior of the housing 1. The driven shaft 3 is extended from the housing 1 at one or both ends for power take-off purposes. With this arrangement there is provided a complete variable speed drive unit subject to convenient and efficient use in various applications.

Objects and advantages herein noted may be achieved by employing as here shown, a plurality of variable diameter driving pulleys 9 on the driving shaft 2, a plurality of variable diameter driven pulleys 10 on the driven shaft 3, and belts 11 in driving relation with the respective driving and driven pulleys. Regardless of the number of pulleys employed, the present invention will provide some of the advantages herein noted by the use of novel means to be hereinafter fully described, for operatively connecting the pulleys with their respective shafts without the use of splines or keyways on the shafts, and wherein an axially movable belt-driven section of each pulley is also free from a positive or keyed driving connection with its respective shaft, in other words, may rotate relative to such shaft.

Each of the driving pulleys 9 includes relatively axially adjustable sections, there being a section 9a driven by the shaft 2 and an axially movable section 9b free on the shaft and driven by contact with a belt 11. The sections 9a and 9b have opposed oppositely inclined belt engaging faces 9c which, according to axial adjustment of the sections 9b, provide variable effective pulley diameters.

As here shown, the sections 9a are opposed and have peripheral flanges 9d which engage one another in a lap joint 9e. A seal 9f is provided at this joint. The hubs 9g of the sections 9a are mounted on resilient bearings 12 surrounding and forming a seal around the shaft. The bearings 12 cooperate with the seal 9f so that the sections 9a form a fluid tight chamber adapted to contain a suitable lubricant. The lubricant is prevented from getting on the pulley 9 and belt 11 by the sealing action of the bearings 12 and additional seals 12' on the shaft 2.

Means are provided for driving the two sections 9a of the driving pulleys 9 without keying or splining these sections to the shaft 2. As here shown, this means includes differential gearing which serves as a common drive means for the two pulley sections 9a. This differential gearing is enclosed by the two sections 9a and includes a drive member or spider 14 having a hub 15 splined as at 16 on the shaft 2 and provided with radial arms 17 mounting driving pinions 18. These pinions mesh with ring gears 19 press fitted or otherwise fixed on the hubs 9g of the pulley sections 9a. This drive means assures that the sections 9a of the pulleys 9 are permitted to have some rotative movement relative to the shaft 2 so that the driving load on the belts 11 and pulleys 9 is balanced or equalized.

The two axially movable sections 9b of the driving pulleys 9 are mounted on axially movable bearing assemblies supported in stationary cup-like members 23 and 24 carried by the housing 1. But one of these bearing assemblies is shown in Fig. 3, the other being mounted in the member 24 and identical with the bearing assembly shown at the right side of Fig. 3. Each bearing assembly includes a suitable bearing unit 25 mounted on the hub 26 of the associated pulley section 9b and within a sleeve 27 which latter is axially slidably supported in the stationary cup-like member associated therewith. The bearing unit 25 is held on the hub 26 by means of the nuts 28 and held within the sleeve 27 between a shoulder 29 and a ring 30. The ring 30 is secured to one end of the sleeve 27 by means of fastenings 31 carries a sealing ring 32 which engages the hub 26. In this connection it should be noted that the hub 26 of each pulley section 9b is mounted on a resilient bearing 33 corresponding to the bearing 12 whereby with the sealing ring 32, a lubricant contained in the cup-like members 23 and 24 will be prevented from leaking out onto the belts 11 and belt engaging faces 9c of the pulley sections 9a and 9b.

The adjusting means 6, as here provided for shifting the pulley sections 9b to vary the effective diameters of the driving pulleys 9, includes a pair of shafts 35 and 36. These shafts are supported by the housing walls and the cup-like members 23 and 24 so that pinion teeth 37 formed on the shafts are enmeshed with rack teeth 38 formed on the exterior of the sleeves 27. The shaft 35 is below the sleeve 27 of the bearing assembly 22 at the right side of the apparatus as shown in Fig. 3, whereas the shaft for the other bearing assembly 22 is located above the sleeve 27 of the latter, whereby simultaneous rotation of the two shafts will cause the two bearing assemblies and the two pulley sections 9b to be moved alike toward or away from the pulley sections 9a depending upon the direction of rotation of the shafts 35 and 36.

Simultaneous rotation of the shafts 35 and 36 is effected by means of a sprocket chain 40 mounted on sprockets 41 and 42 on the shafts 35 and 36 respectively. The sprocket 42 is driven by a gear 43 fixed thereto. The gear 43 is driven by a pinion 44 on shaft 45. The shaft 45 is supported by and extends through a wall of the housing 1 as shown in Fig. 3 and has the hand wheel 7 fixed on the outer end thereof. It will now be apparent that appropriate rotation of thte hand wheel 7 will cause the adjusting means 6 to be operated so as to simultaneously vary the diameter of the driving pulleys 9 and thus vary the speed of the driven or power take-off shaft 3.

The driven pulleys 10 are adjusted simultaneously with the adjustments made in the driving pulleys 9, due to the action of the belts 11 and in consequence, the loads on the belts and the pulleys are balanced and equalized in a manner assuring an efficient variable speed power transmission in all adjustments thereof.

The driven pulleys 10 are also constructed and arranged so that they may be operatively associated with the driven shaft 3 without the use of keyway or splines.

Each of the driven pulleys 10 comprises a positively driven section 10a and an axially movable section 10b, the hub 10c of the latter being mounted on a resilient bearing 46 corresponding to the bearings 12 and 33. The sections 10a and 10b are provided with opposed and oppositely inclined belt engaging faces 10d corresponding to the faces 9c on the driving pulleys 9.

The positively driven sections 10a are drivingly connected with the shaft 3 by identical means only one of which will be described. As shown in Fig. 4 one such means includes a tapered split bushing 47 surrounding the shaft 3 with its tapered surface engaging a tapered surface 48 of the bore through the hub 49 of the pulley section 10a. Axial movement of the split bushing 47 in one direction causes the bushing to wedge against the surface 48 and thus clamp around the shaft 3 and against the surface 48, whereas movement of the bushing in the opposite direction loosens the bushing.

As a means of tightening the bushing 47, bearing balls 50 are engaged with the inclined wall 51 of a circumferential groove 52 in the bushing whereby inward movement of these balls will move the bushing in the direction causing it to clamp effectively against the inclined surface 48 of the hub 49 also against the shaft and thus provide a positive driving connection between the shaft and the pulley section 10a. This inward movement of the balls 50 may be effected by appropriate turning of set screws 53 operable in screw threaded bores 54 extending radially through the hub 49, the set screws bearing against the balls 50.

As a means for relieving the clamping action of the split bushing 47, a bore 56 in the hub 49, and set screw 57 are positioned and operable so that a ball 58 may be placed in the bore 56 to engage the inclined side wall 59 of the groove 52 (see Fig. 8) opposite the side wall 51, and forced inwardly to move the bushing in the direction for relieving the clamping action thereof. This means for drivingly connecting the driven pulley sections 10a with the driven shaft 3 makes it unnecessary to employ splines or keyways on the shaft, also facilitates assembling and disassembling of the driven structure of the apparatus.

The axially movable sections 10b of the driven pulleys 10 are opposed to one another and disposed between the pulley sections 10a, this being the opposite of the arrangement of the sections 9a and 9b of the driving pulleys 9.

It is desired to connect the axially movable driven pulley sections 10b for joint rotation and so that they will move axially simultaneously with axial adjustments of the driving pulley sections 9b. It is also desired that the driven pulley sections 10b be maintained in frictional driving relationship with the belts 11 and the driven shaft 3. Accordingly, means are provided for resiliently urging the axially movable sections 10b toward the sections 10a so that the belt engaging faces 10d of the sections 10b will be maintained in effective frictional engagement with the belts 11. This resilient urging means also yields so that when the driven pulley sections 9b are adjusted axially toward the driving pulley sections 9a, the driven pulley sections 10b will be moved by the belts 11 in a direction away from the driven pulley sections 10a. Additionally this resilient urging means includes provisions for effecting a frictional drive connection of each of the pulley sections 10b with the driven shaft 3.

For the purposes next above noted, a driving means including a hub 63 splined as at 64 on the shaft 3 between the pulley sections 10b, is provided with a pair of arms 65 and 66 extending radially from the hub for operative connection with the two pulley sections 10b. The arms 65 are 180 degrees apart as are the arms 66.

As seen in Fig. 3 the arms 65 slidably support pairs of pins 67 fixed to an annular friction plate 68 surrounding the shaft and frictionally engaged with an annular surface 69 on the one of the pulley sections 10b. Guide pins 70 carried by the annular plate 68 are also slidably supported on the arms 65 between the pins 67. Coiled springs 71 are carried by the arms 65 and are engaged with the pairs of pins 67 so as to resiliently urge these pins in the direction causing the friction plate 68 to frictionally engage the adjacent pulley section 10 and urge the latter against the associated belt 11. Each spring 71, there being one on each arm 65, is provided with a U-shaped loop 72, two coiled portions 73 on opposite sides of the loop, and two end portions 74. The coiled portions 73 surround end portions of a pin 65a extending transversely through the arm 65, whereas the U-shaped loop 72 embraces the arm 65 while the end portions 74 of the spring engage in recesses 75 in the adjacent ends of the pins 67 in a manner urging the friction plate 68 against the adjacent axially movable pulley section 10b.

Referring now to Fig. 6, it will be seen that the other driving arms 66 slidably support pins 78 and 79, connected with an annular friction plate 80 engaged with a surface 81 of the other pulley section 10b. The pins 78 and 79 correspond to the pins 67 and 70 respectively. Springs 82 on the arms 66 are constructed and arranged in the same manner as the springs 71 on the arms 65, and urge the friction plate 80 against the adjacent pulley section 10b. The construction of the springs 71 and 82 is such that the force thereof assures the desired frictional drive connection of the axially movable sections 10b with the belts 11 and the driven shaft 3 in all adjustments of the drive mechanism.

Fig. 9 shows in detail the construction of one of the resilient bearings 46 for the axially movable sections 10b of the two pulleys 10. This bearing is of the same construction as the bearing 12 and 33 used in connection with pulleys 9 and comprises a pair of concentric steel bands 83 and 84, a cushioning band 85 of resilient rubber or synthetic rubber between the bands 83 and 84, and a band 86 of suitable bearing material lining the inner steel band 84. Marginal flanges 83' and 84' on the bands 83 and 84 confine between them marginal sealing flanges 87 on the cushioning band 85. These sealing flanges are grooved to define a pair of sealing lips 87' in sealing engagement with the shaft 3. The outer band 83 bears against the interior surface of the hub of the pulley section 10b while the inner band 85 bears against the smooth surface of the shaft 3.

It will now be apparent that the shafts 2 and 3, in being free from keyways or splines, make it possible to advantageously use the resilient and cushioned bearings as shown in Fig. 9, whereby the assembling and disassembling of the pulleys in the shafts is facilitated, shocks and jars are absorbed by the cushioning elements in the bearings, provision is made for free sliding movement of the axially adjustable pulley sections at all times without likelihood of the jamming or sticking thereof on the shafts, and the lubricant used in the device is prevented from getting on the pulleys and belts due to sealing action of the bearings on the shafts.

The driven shaft 3 may as shown in Fig. 4 be supported adjacent its ends on bearings 89 on opposed walls of the housing 1.

It will now be apparent that variable speed transmission mechanism embodying the present invention constitutes a simply constructed, compact and complete drive unit subject to various uses as an efficient power unit wherein the driving load will be equalized between two or more variable diameter pulleys subject to the desired control at the will of the operator.

I claim:

1. In variable speed transmission mechanism: a driving shaft; a driven shaft; a variable diameter driving pulley on said driving shaft; a variable diameter driven pulley on said driven shaft; a belt drivingly connecting said pulleys; each of said pulleys including a pair of relatively axially adjustable sections having opposed oppositely inclined belt engaging faces; gears on said driving shaft and one section of said driving pulley respectively, cooperable for driving said one section; the other section of said driving pulley being axially adjustable on and rotatable relative to said driving shaft; means for effecting axial adjustment of said other section of said driving pulley; means drivingly connecting said driven shaft with one section of said driven pulley; the other section of said driven pulley being axially adjustable on and rotatable relative to said driven shaft; and means providing a frictional driving connection between said driven shaft and said other section of said driven pulley.

2. In variable speed transmission mechanism: a driving shaft; a driven shaft; a variable diameter driving pulley on said driving shaft; a variable diameter driven pulley on said driven shaft; a belt drivingly connecting said pulleys; each of said pulleys including a pair of relatively axially adjustable sections having opposed oppositely inclined belt engaging faces; gears on said driving shaft and one section of said driving pulley respectively, cooperable for driving said one section; the other section of said driving pulley being axially adjustable on and rotatable relative to said driving shaft; means for effecting axial adjustment of said other section of said driving pulley; means drivingly connecting said driven shaft with one section of said driven pulley; the other section of said driven pulley being axially adjustable on and rotatable relative to said driven shaft; and means axially yieldable relative to said driven shaft providing a frictional driving connection between said driven shaft and said other section of said driven pulley.

3. In variable speed transmission mechanism: a driving shaft; a driven shaft; a variable diameter driving pulley on said driving shaft; a variable diameter driven pulley on said driven shaft; a belt drivingly connecting said pulleys; each of said pulleys including a pair of relatively axially adjustable sections having opposed oppositely inclined belt engaging faces; means fixed on said driving shaft and one section of said driving pulley respectively, cooperable for driving said one section; the other section of said driving pulley being axially adjustable on and rotatable relative to said driving shaft; means for effecting axial adjustment of said other section of said driving pulley; means drivingly connecting said driven shaft with one section of said driven pulley; the other section of said driven pulley being axially adjustable on and rotatable relative to said driven shaft; and means resiliently urging said other section of said driven pulley toward said one section of said driven pulley and providing a frictional drive connection between said driven shaft and said other section of said driven pulley.

4. In variable speed transmission mechanism: a driving shaft; a driven shaft; a variable diameter driving pulley on said driving shaft; a variable diameter driven pulley on said driven shaft; a belt drivingly connecting said pulleys; each of said pulleys including a pair of relatively axially adjustable sections having opposed oppositely inclined belt engaging faces; gears on said driving shaft and one section of said driving pulley respectively, cooperable for driving said one section; the other section of said driving pulley being axially adjustable on and rotatable relative to said driving shaft; means for effecting axial adjustment of said other section of said driving pulley; means drivingly connecting said driven shaft with one section of said driven pulley; the other section of said driven pulley being axially adjustable on and rotatable relative to said driven shaft; and means resiliently urging said other section of said driven pulley against said belt and providing a frictional driving connection between said other section of said driven pulley and said driven shaft.

5. In a variable speed transmission mechanism: a driving shaft; a driven shaft; variable diameter driving pulleys on said driving shaft; variable diameter driven pulleys on said driven shaft; belts drivingly connecting said driving and driven pulleys; each of said pulleys including a pair of relatively axially adjustable sections having opposed oppositely inclined belt engaging faces; means providing a driving connection of said driving shaft with one section of each of said driving pulleys; the other section of each of said driving pulleys being axially adjustable on and rotatable relative to said driving shaft; means for simultaneously correspondingly axially adjusting said other sections of said driving pulleys; means for drivingly connecting said driven shaft with one section of each of said driven pulleys; the other section of each of said driven pulleys being axially adjustable on and rotatable relative to said driven shaft; and means providing a frictional driving connection between said driven shaft and said other section of each of said driven pulleys.

6. In a variable speed transmission mechanism: a driving shaft; a driven shaft; variable diameter driving pulleys on said driving shaft; variable diameter driven pulleys on said driven shaft; belts drivingly connecting said driving and driven pulleys; each of said driving and driven pulleys including a pair of relatively axially adjustable sections having opposed oppositely inclined belt engaging faces; means providing a driving connection of said drive shaft with one section of each of said driving pulleys; the other section of each of said driving pulleys being axially adjustable on and rotatable relative to said driving shaft; means for simultaneously correspondingly axially adjusting said other sections of said driving pulleys; means for drivingly connecting said driven shaft with one section of each of said driven pulleys; the other section of each of said driven pulleys being axially adjustable on and rotatable relative to said driven shaft; and means axially yieldable relative to said driven shaft providing a frictional driving connection between said driven shaft and said other section of each of said driven pulleys.

7. In a variable speed transmission mechanism: a driving shaft; a driven shaft; variable diameter driving pulleys on said driving shaft; variable diameter driven pulleys on said driven shaft; belts drivingly connecting said driving and driven pulleys; each of said driving and driven pulleys including a pair of relatively axially adjustable sections having opposed oppositely inclined belt engaging faces; means providing a driving connection of said drive shaft with one section of each of said driving pulleys; the other section of each of said driving pulleys being axially adjustable on and rotatable relative to said driving shaft; means for simultaneously correspondingly axially adjusting said other sections of said driving pulleys; means for drivingly connecting said driven shaft with one section of each of said driven pulleys; the other section of each of said driven pulleys being axially adjustable on and rotatable relative to said driven shaft; and means resiliently urging said other sections of said driven pulleys against said belts and providing a frictional drive connection between said other sections of said driven pulleys and said driven shaft.

8. In a variable speed transmission mechanism: a driving shaft; a driven shaft; a pair of variable diameter driving pulleys on said driving shaft; a pair of variable diameter driven pulleys on said driven shaft; belts operatively engaged with said driving and driven pulleys; each of said driving and driven pulleys including a pair of relatively axially adjustable sections having opposed oppositely inclined belt engaging faces; a resilient shock-absorbing bearing unit mounting each section of a pair of the sections of said driving pulleys for rotation and axial adjustment relative to said driving shaft; differential gearing drivingly connecting the other sections of said driving pulleys with said driving shaft; means drivingly connecting a pair of sections of said driven pulleys with said driven shaft; the other sections of said driven pulleys being mounted for axial adjustment and rotation relative to said driven shaft; drive means interposed between and providing a drive connection of said axially adjustable sections of said driven pulleys permitting said axial adjustment and rotation thereof; and means for simultaneously axially adjusting said axially adustable sections of said driving pulleys.

9. In a variable speed transmission mechanism: a driving shaft; a driven shaft; a pair of variable diameter driving pulleys on said driving shaft; a pair of variable diameter driven pulleys on said driven shaft; belts operatively engaged with said driving and driven pulleys; each of said driving and driven pulleys including a pair of relatively axially adjustable sections having opposed oppositely inclined belt engaging faces; a pair of the sections of said driving pulleys being mounted for rotation and axial adjustment relative to said driving shaft; differential gearing drivingly connecting the other sections of said driving pulleys with said driving shaft; means drivingly connecting a pair of sections of said driven pulleys with said driven shaft; the other sections of said driven pulleys being mounted for axial adjustment and rotation relative to said driven shaft; a driving member keyed to said driven shaft; between said other sections of said driven pulleys; annular members arranged between said other sections of said driven pulleys for frictionally engaging said other sections of said driven pulleys; means carried by said driving member resiliently urging said annular members against said other sections of said driven pulleys for moving the latter axially toward said pair of sections of said driven pulleys; and means for simultaneously axially adjusting said axially adjustable sections of said driving pulleys.

10. In a variable speed transmission mechanism: a driving shaft; a driven shaft; a pair of variable diameter driving pulleys on said driving shaft; a pair of variable diameter driven pulleys on said driven shaft; belts operatively engaged with said driving and driven pulleys; each of said driving and driven pulleys including a pair of relatively axially adjustable sections having opposed oppositely inclined belt engaging faces; a pair of the sections of said driving pulleys being mounted for rotation and axial adjustment relative to said driving shaft; differential gearing drivingly connecting the other sections of said driving pulleys with said driving shaft; means drivingly connecting a pair of said sections of said driven pulleys with said driven shaft; the other sections of said driven pulleys being mounted for axial adjustment and rotation relative to said driven shaft; means drivingly connected with said driven shaft providing a yieldable frictional drive connection between said driven shaft and said other sections of said driven pulleys; and means for simultaneously axially adjusting said axially adjustable sections of said driving pulleys.

11. In a variable speed transmission mechanism a driving shaft a driven shaft a pair of variable diameter driving pulleys on said driving shaft a pair of variable diameter driven pulleys on said driven shaft; belts operatively engaged with said driving and driven pulleys; each of said driving and driven pulleys including a pair of relatively axially adjustable sections having opposed oppositely inclined belt engaging faces; a pair of the sections of said driving pulleys being mounted for rotation and axial adjustment relative to said driving shaft; a driving member keyed to said shaft between the other sections of said driving pulleys; gears fixed to said other sections of said driving pulleys; gears on said driving member meshing with said gears on said other sections of said driving pulleys; means drivingly connecting a pair of the sections of said driven pulleys with said driven shaft; the other sections of said driven pulleys being axially adjustable and rotatable relative to said driven shaft; means resiliently urging said other sections of said driven pulleys and providing a frictional driving connection of said other sections of said driven pulleys with said driven shaft; and means for simultaneously axially adjusting said axially adjustable sections of said driving pulleys.

12. In a variable speed transmission mechanism: a driving shaft; a driven shaft; a pair of variable diameter driving pulleys on said driving shaft; a pair of variable diameter driven pulleys on said driven shaft; belts operatively engaged with said driving and driven pulleys; each of said driving and driven pulleys including a pair of relatively axially adjustable sections having opposed oppositely inclined belt engaging faces; a pair of the sections of said driving pulleys being mounted for rotation and axial adjustment relative to said driving shaft; a driving member keyed to said shaft between the other sections of said driving pulleys; gears fixed to said other sections of said driving pulleys; gears on said driving member meshing with said gears on said other sections of said driving pulleys; means drivingly connecting a pair of the sections of said driven pulleys with said driven shaft; the other sections of said driven pulleys being axially adjustable and rotatable relative to said driven shaft; a driving element keyed to said driven shaft between said other sections of said driven pulleys; a pair of annular members surrounding said driven shaft and frictionally engaging said other sections of said driven pulleys; pins slidably on said last named driving member drivingly engaged with said annular members; and springs on said last named driving member urging said pins in the direction for holding said annular members in frictional driving engagement with said other sections of said driven pulleys.

13. In a variable speed transmission mechanism: a driving shaft; a driven shaft; a variable diameter driving pulley mounted on said driving shaft; a variable diameter driven pulley mounted on said driven shaft; a belt drivingly connecting said pulleys; each of said pulleys including a pair of relative axially adjustable sections having opposed oppositely inclined belt engaging faces; means drivingly connecting said driving shaft with one section of said driving pulley; a bearing unit axially slidable and rotatable on said driving shaft; said bearing unit supporting the other section of said driving pulley for axial adjustment and rotative movement relative to said driving shaft; means for axially adjusting said other section of said driving pulley; means drivingly connecting one section of said driven pulley with said driven shaft; a bearing unit slidable and rotatable on said driven shaft supporting said other section of said driven pulley for axial adjustment and rotative movement relative to said driven shaft; and means resiliently urging said other section of said driven pulley against said belt and providing a frictional driving connection between said other section of said driven pulley and said driven shaft.

14. In a variable speed transmission mechanism: a driving shaft; a driven shaft; a variable diameter driving pulley mounted on said driving shaft; a variable diameter driven pulley mounted on said driven shaft; a belt drivingly connecting said pulleys; each of said pulleys including a pair of relatively axially adjustable sections having opposed oppositely inclined belt engaging faces; means drivingly connecting said driving shaft with one section of said driving pulley; a pair of concentric bands having a cushioning band therebetween and a bearing band lining one of the concentric bands; said bands being axially slidable and rotatable as a unit relative to said driving shaft; said bearing band engaging said driving shaft; the other of said concentric bands supporting the other driving pulley section for axial adjustment and rotation relative to said driving shaft; means for axially adjusting said axially movable section of said driving pulley; means drivingly connecting one section of said driven pulley with said driven shaft; the other section of said driven pulley being axially adjustable and rotatable relative to said driven shaft; and means providing a resilient frictional drive connection between said axially adjustable section of said driven pulley and said driven shaft.

15. In a variable speed transmission mechanism: a driving shaft; a driven shaft; variable diameter driving pulleys on said driving shaft; variable diameter driven pulleys on said driven shaft; belts drivingly connecting said driving and driven pulleys; each of said driving and driven pulleys including a pair of relatively axially adjustable sections having opposed oppositely inclined belt engaging faces; means providing a driving connection of said drive shaft with one section of each of said driving pulleys; means mounting the other sections of said driving pulleys for axial adjustment relative to said driving shaft; means for simultaneously correspondingly axially adjusting said axially movable sections of said driving pulleys; one of the sections of each driven pulley being axially adjustable and rotatable relative to said driven shaft; a driving member keyed to said driven shaft between said axially movable sections of said driven pulleys; annular frictional drive members surrounding and axially movable relative to said driven shaft for frictionally drivingly engaging said axially movable sections of said driven pulleys; means carried by said driving member drivingly connecting said annular drive members with said driving member; and means cooperable with said last named means for resiliently urging said annular drive member against said axially movable sections of said driven pulleys.

16. In a transmission mechanism having a pair of rotary shafts, a variable diameter pulley on each shaft, and a belt drivingly connecting said pulleys, each pulley comprising a pair of opposed pulley sections having belt-engaging faces; the improvement which includes means mounting each of the pulley sections on one of said shafts for rotative movement relative to the shaft; adjusting means for axially moving one of the pulley sections on said one shaft; gear means drivingly coupled with said one shaft; a gear connected with the other of the pulley sections on said one shaft and operatively engaged with said gear means; means on the other of said shafts mounting one of the pulley sections thereon for axial movement and rotative movement relative to said other shaft; a driving element keyed to said other shaft and projecting in entirety radially therefrom at the side of said last named pulley section opposite said belt-engaging face thereof; a driving element carried by said last named pulley section at said side thereof; drive means engaged with said driving elements to provide a driving connection between said last named pulley section and said other shaft permitting said axial movement and relative rotation of said last named pulley section; and means drivingly connecting said other shaft with the other pulley section on said other shaft.

17. In a variable speed transmission mechanism: a pair of shafts; a pair of variable diameter pulleys on each of said shafts; a pair of belts drivingly connecting the pulleys on one shaft with the pulleys on the other shaft; each of said pulleys including a pair of relatively axially adjustable sections having opposed oppositely inclined belt-engaging faces; differential gear drive means including gears on one of said shafts and one section of each pulley on said one shaft, respectively; means mounting the other section of each pulley on each shaft for axial adjustment and rotation relative thereto; means providing a driving connection between the other of said shafts and the axially adjustable sections thereon; said last named means including a driving element keyed to said other shaft and projecting radially therefrom between the opposed sides of said last named axially adjustable sections; driving elements carried by said last named sections at said sides thereof; drive means engaged with said driving elements to provide a driving connection between said last named pulley sections and said other shaft permitting said relative rotative movement between said other shaft and said last named sections thereon; and means providing a drive connection between the other sections of the pulleys on said other shaft.

18. In a variable speed transmission mechanism: a pair of shafts; variable diameter pulleys on each of said shafts; belts drivingly connecting the pulleys on one shaft with the pulleys on the other shaft; each of said pulleys including a pair of relatively axially movable sections having opposed oppositely inclined belt engaging faces; means providing a differential gear drive connection of one of said shafts with one of the sections of each pulley thereon; the other section of each pulley on said one shaft being axially adjustable thereon and rotatable relative thereto; means providing a drive connection between said other shaft and one section of each pulley thereon; the other section of each pulley on said other shaft being axially adjustable on and rotatable relative thereto; a driving element keyed to said other shaft and projecting radially between opposed sides of said last named axially adjustable pulley sections; driving elements carried by said last named axially adjustable pulley sections at said sides thereof; and drive means movable on said driving element engaging said driving elements to permit said relative axial adjustment and rotation of said last named pulley sections.

19. In a variable speed transmission mechanism: a driving shaft; a driven shaft; a variable diameter driving pulley mounted on said driving shaft; a variable diameter driven pulley mounted on said driven shaft; a belt drivingly connecting said pulleys; each of said pulleys including a pair of relatively axially adjustable sections having opposed oppositely inclined belt engaging faces; means drivingly connecting said driving shaft with one section of said driving pulley; a pair of concentric bands having a cushioning band therebetween and a bearing band lining one of the concentric bands; said bands being axially slidable and rotatable as a unit relative to said driving shaft; said bearing band engaging said driving shaft; the other of said concentric bands supporting the other driving pulley section for axial adjustment and rotation relative to said driving shaft; means for axially adjusting said axially movable section of said driving pulley; and means drivingly connecting one section of said driven pulley with said driven shaft; the other section of said driven pulley being axially adjustable and rotatable relative to said driven shaft.

20. In a variable speed transmission mechanism: a driving shaft; a driven shaft; variable diameter driving pulleys on said driving shaft; variable diameter driven pulleys on said driven shaft; belts drivingly connecting said driving and driven pulleys; each of said driving and driven pulleys including a pair of relatively axially adjustable sections having opposed oppositely inclined belt engaging faces; means providing a driving connection of said drive shaft with one section of each of said driving pulleys; the other section of each of said driving pulleys being axially adjustable on and rotatable relative to said driving shaft; means for drivingly connecting said driven shaft with one section of each of said driven pulleys; the other section of each of said driven pulleys being axially adjustable on and rotatable relative to said driven shaft; a pair of concentric bands having a cushioning band therebetween and a bearing band lining one of the concentric bands; said bearing band surrounding and engaging said driven shaft; the other of said concentric bands supporting said axially movable sections on said driven shaft.

21. In a variable speed transmission mechanism: a driving shaft; a driven shaft; variable diameter driving pulleys on said driving shaft; variable diameter driven pulleys on said driven shaft; belts drivingly connecting said driving and driven pulleys; each of said driving and driven pulleys including a pair of relatively axially adjustable sections having opposed oppositely inclined belt engaging faces; means providing a driving connection of said drive shaft with one section of each of said driving pulleys; the other section of each of said driving pulleys being axially adjustable on and rotatable relative to said driving shaft; means for drivingly connecting said driven shaft with one section of each of said driven pulleys, the other section of each of said driven pulleys being axially adjustable on and rotatable relative to said driven shaft; and bearing units for the pulley sections on said driving shaft and for the axially movable sections on said driven shafts; each of said bearing units comprising a pair of concentric bands surrounding said shafts; a cushioning band between said concentric bands; and a bearing band lining one of said concentric bands for engaging the associated shaft; the other of said concentric bands supporting one of the pulley sections.

22. In a variable speed transmission mechanism: a driving shaft; a driven shaft; a pair of variable diameter driving pulleys on said driving shaft; a pair of variable diameter driven pulleys on said driven shaft; belts operatively engaged with said driving and driven pulleys; each of said driving and driven pulleys including a pair of relatively axially adjustable sections having opposed oppositely inclined belt engaging faces; a resilient shock-absorbing bearing unit mounting each section of a pair of the sections of said driving pulleys for rotation and axial adjustment relative to said driving shaft; differential gearing drivingly connecting the other sections of said driving pulleys with said driving shaft; means drivingly connecting a pair of sections of said driven pulleys with said driven shaft; a resilient shock-absorbing bearing unit mounting each of the other sections of said driven pulleys for axial adjustment and rotation relative to said driven shaft; drive means located between said axially adjustable driven pulley sections providing a driving connection thereof with said driven shaft permitting said relative axial adjustment and rotation thereof; and means for simultaneously axially adjusting said axially adjustable sections of said driving pulleys.

23. In a variable speed transmission mechanism: a driving shaft; a driven shaft; a pair of variable diameter driving pulleys on said driving shaft; a pair of variable diameter driven pulleys on said driven shaft; belts operatively engaged with said driving and driven pulleys; each of said driving and driven pulleys including a pair of relatively axially adjustable sections having opposed oppositely inclined belt engaging faces; a resilient shock-absorbing bearing unit mounting each section of a pair of the sections of said driving pulleys for rotation and axial adjustment relative to said driving shaft; differential gearing drivingly connecting the other sections of said driving pulleys with said driving shaft; a resilient shock-absorbing unit mounting each of said other sections of said driving pulleys on said driving shaft permitting relative rotation of said other sections of said driving pulley and said driving shaft, means keying a pair of sections of said driven pulleys to said driven shaft; a resilient shock-absorbing bearing unit mounting each of the other sections of said driven pulleys for axial adjustment and rotation relative to said driven shaft; drive means between said axially adjustable driven pulley sections providing a driving connection thereof with said driven shaft permitting said relative axial adjustment and rotation thereof; and means for simultaneously axially adjusting said axially adjustable driving pulley sections.

24. In a variable speed transmission mechanism: a driving shaft; a driven shaft; variable diameter driving pulleys on said driving shaft; variable diameter driven pulleys on said driven shaft; belts drivingly connecting said driving and driven pulleys; each of said pulleys including a pair of relatively axially adjustable sections having opposed oppositely inclined belt engaging faces; means providing a driving connection of said driving shaft with one section of each of said driving pulleys; the other section of each of said driving pulleys being axially adjustable on and rotatable relative to said driving shaft; means for simultaneously correspondingly axially adjusting said other sections of said driving pulleys; means for drivingly connecting said driven shaft with one section of each of said driven pulleys; the other section of each of said driven pulleys being axially adjustable on and rotatable relative to said driven shaft; and friction drive means between said driven shaft and said axially adjustable driven pulley sections providing for said relative axial adjustment and rotation of said axially adjustable driven pulley sections; said friction driven means including a pair of spring units independently and resiliently biasing said axially adjustable driven pulley sections in opposite directions against said belts.

25. In a variable speed transmission mechanism: a driving shaft; a driven shaft; variable diameter driving pulleys on said driving shaft; variable diameter driven pulleys on said driven shaft; belts drivingly connecting said driving and driven pulleys; each of said pulleys including a pair of relatively axially adjustable sections having opposed oppositely inclined belt engaging faces; means providing a driving connection of said driving shaft with one section of each of said driving pulleys; the other section of each of said driving pulleys being axially adjustable on and rotatable relative to said driving shaft; means for simultaneously correspondingly axially adjusting said other sections of said driving pulleys; means for drivingly connecting said driven shaft with one section of each of said driven pulleys; the other section of each of said driven pulleys being axially adjustable on and rotatable relative to said driven shaft; and friction drive means between said driven shaft and said axially adjustable driven pulley sections providing for said relative axial adjustment and rotation of said axially adjustable driven pulley sections; said friction drive means including a drive element keyed to said driven shaft; friction drive means movably mounted on opposite sides of said drive element for effecting a frictional drive connection with said axially adjustable driven pulley sections and permitting said relative axial adjustment and rotative movement of said last named pulley sections; and separate spring units connected with said drive element and said friction drive members for independently urging said axially adjustable driven pulley sections against said belts.

References Cited in the file of this patent

UNITED STATES PATENTS

| | | |
|---|---|---|
| 818,047 | Power | Apr. 17, 1906 |
| 1,727,232 | Farrell | Sept. 3, 1929 |
| 2,223,872 | McWhorter et al. | Dec. 3, 1940 |
| 2,607,235 | Ruegenberg | Aug. 19, 1952 |
| 2,776,575 | Michie | Jan. 8, 1957 |
| 2,831,358 | Michie | Apr. 22, 1958 |